(12) United States Patent
Orange et al.

(10) Patent No.: US 10,471,497 B2
(45) Date of Patent: Nov. 12, 2019

(54) THREE-DIMENSIONAL PRINTED METAL-CASTING MOLDS AND METHODS FOR MAKING THE SAME

(71) Applicant: The ExOne Company, North Huntingdon, PA (US)

(72) Inventors: Michael J. Orange, Latrobe, PA (US); Daniel T. Brunermer, Leechburg, PA (US)

(73) Assignee: The ExOne Company, North Huntingdon, PA (US)

( * ) Notice: Subject to any disclaimer, the term of this patent is extended or adjusted under 35 U.S.C. 154(b) by 0 days.

(21) Appl. No.: 14/911,866

(22) PCT Filed: Aug. 13, 2014

(86) PCT No.: PCT/US2014/050837
§ 371 (c)(1),
(2) Date: Feb. 12, 2016

(87) PCT Pub. No.: WO2015/023729
PCT Pub. Date: Feb. 19, 2015

(65) Prior Publication Data
US 2016/0193651 A1 Jul. 7, 2016

Related U.S. Application Data

(60) Provisional application No. 61/959,174, filed on Aug. 16, 2013.

(51) Int. Cl.
*B22C 9/02* (2006.01)
*C08L 5/00* (2006.01)
*B33Y 10/00* (2015.01)
*B22C 1/20* (2006.01)
*B29C 64/165* (2017.01)

(52) U.S. Cl.
CPC .............. *B22C 9/02* (2013.01); *B22C 1/20* (2013.01); *C08L 5/00* (2013.01); *B29C 64/165* (2017.08); *B33Y 10/00* (2014.12)

(58) Field of Classification Search
CPC ................... C08L 5/00; B33Y 10/00
See application file for complete search history.

(56) References Cited

U.S. PATENT DOCUMENTS

| | | | |
|---|---|---|---|
| 4,948,615 A * | 8/1990 | Zallie | A23G 3/0242 426/573 |
| 5,132,128 A * | 7/1992 | Rockland | A23G 3/343 426/101 |
| 5,902,441 A | 5/1999 | Bredt et al. | |
| 6,080,813 A | 6/2000 | Wendel et al. | |
| 6,531,174 B2 * | 3/2003 | Barrett | A23G 3/346 426/573 |
| 6,585,930 B2 | 7/2003 | Liu et al. | |
| 7,332,537 B2 | 2/2008 | Bredt et al. | |
| 7,531,117 B2 | 5/2009 | Tsubaki et al. | |
| 7,550,518 B2 | 6/2009 | Bredt et al. | |
| 7,955,537 B2 | 6/2011 | Ederer et al. | |
| 8,211,226 B2 | 7/2012 | Bredt et al. | |
| 8,506,870 B2 | 8/2013 | Hochsmann et al. | |
| 2002/0026982 A1 | 3/2002 | Bredt et al. | |
| 2006/0172016 A1 * | 8/2006 | Kohutiak | A23L 2/54 424/680 |
| 2006/0230984 A1 * | 10/2006 | Bredt | B29C 67/0081 106/690 |
| 2010/0140823 A1 | 6/2010 | Asano et al. | |
| 2011/0073270 A1 | 3/2011 | Stoetzel et al. | |
| 2011/0129387 A1 | 6/2011 | Stancliffe et al. | |
| 2011/0220316 A1 | 9/2011 | Fuqua et al. | |
| 2011/0268873 A1 | 11/2011 | Blette | |
| 2012/0126092 A1 | 5/2012 | Jattke | |
| 2012/0217373 A1 | 8/2012 | Ide et al. | |
| 2013/0032689 A1 | 2/2013 | Haanepen et al. | |
| 2014/0295024 A1 * | 10/2014 | Campbell | A23G 4/10 426/5 |

FOREIGN PATENT DOCUMENTS

| | | | | |
|---|---|---|---|---|
| EP | 1272334 B1 | 11/2012 | | |
| JP | WO 2004087823 A1 * | 10/2004 | ........... | C08D 11/106 |
| WO | 2004113042 A2 | 12/2004 | | |

* cited by examiner

*Primary Examiner* — Vickey Nerangis
(74) *Attorney, Agent, or Firm* — Thomas Lizzi

(57) ABSTRACT

Methods are disclosed of making metal casting molds and components thereof by the three-dimensional printing process in which an untreated sand is used as the build material and a polymer is used as a component of the binder that is printed onto the build material.

5 Claims, 3 Drawing Sheets

THREE-DIMENSIONAL PRINTED METAL-CASTING MOLDS AND METHODS FOR MAKING THE SAME

BACKGROUND

Field of the Invention

The present invention relates to metal-casting molds made by three-dimensional printing and methods for making the molds.

Background of the Invention

The characteristics needed for molds into which molten metal is cast are well known in the art. For example, see U.S. Pat. No. 6,080,813 and the following United States published patent applications: 2010/0140823 A1 of Asano et al., 2011/0073270 A1 of Stötzel et al., 2011/0129387 A1 of Stancliffe et al., 2011/0220316 A1 of Fuqua et al., 2012/0126092 of Jattke, 2012/0217373 A1 of Ide et al., and 2013/0032689 A1 of Haanepen et al.

Three dimensional printing was developed in the 1990's at the Massachusetts Institute of Technology and is described in several United States patents, including the following United States patents: U.S. Pat. No. 5,490,882 to Sachs et al., U.S. Pat. No. 5,490,962 to Cima et al., U.S. Pat. No. 5,518,680 to Cima et al., U.S. Pat. No. 5,660,621 to Bredt et al., U.S. Pat. No. 5,775,402 to Sachs et al., U.S. Pat. No. 5,807,437 to Sachs et al., U.S. Pat. No. 5,814,161 to Sachs et al., U.S. Pat. No. 5,851,465 to Bredt, 5,869,170 to Cima et al., U.S. Pat. No. 5,940,674 to Sachs et al., U.S. Pat. No. 6,036,777 to Sachs et al., U.S. Pat. No. 6,070,973 to Sachs et al., U.S. Pat. No. 6,109,332 to Sachs et al., U.S. Pat. No. 6,112,804 to Sachs et al., U.S. Pat. No. 6,139,574 to Vacanti et al., U.S. Pat. No. 6,146,567 to Sachs et al., U.S. Pat. No. 6,176,874 to Vacanti et al., U.S. Pat. No. 6,197,575 to Griffith et al., U.S. Pat. No. 6,280,771 to Monkhouse et al., U.S. Pat. No. 6,354,361 to Sachs et al., U.S. Pat. No. 6,397,722 to Sachs et al., U.S. Pat. No. 6,454,811 to Sherwood et al., U.S. Pat. No. 6,471,992 to Yoo et al., U.S. Pat. No. 6,508,980 to Sachs et al., U.S. Pat. No. 6,514,518 to Monkhouse et al., U.S. Pat. No. 6,530,958 to Cima et al., U.S. Pat. No. 6,596,224 to Sachs et al., U.S. Pat. No. 6,629,559 to Sachs et al., U.S. Pat. No. 6,945,638 to Teung et al., U.S. Pat. No. 7,077,334 to Sachs et al., U.S. Pat. No. 7,250,134 to Sachs et al., U.S. Pat. No. 7,276,252 to Payumo et al., U.S. Pat. No. 7,300,668 to Pryce et al., U.S. Pat. No. 7,815,826 to Serdy et al., U.S. Pat. No. 7,820,201 to Pryce et al., U.S. Pat. No. 7,875,290 to Payumo et al., U.S. Pat. No. 7,931,914 to Pryce et al., U.S. Pat. No. 8,088,415 to Wang et al., U.S. Pat. No. 8,211,226 to Bredt et al., and U.S. Pat. No. 8,465,777 to Wang et al.

In essence, three-dimensional printing involves the spreading of a layer of particulate material and then selectively jet-printing a fluid onto that layer to cause selected portions of the particulate layer to bind together. This sequence is repeated for additional layers until the desired part has been constructed. The material making up the particulate layer is often referred as the "build material" and the jetted fluid is often referred to as a "binder", or in some cases, an "activator". Post-processing of the three-dimensionally printed part is often required in order to strengthen and/or densify the part.

Three-dimensional printing has been used in the past for making molds for casting metals. For example, see the following United States patents: U.S. Pat. No. 7,087109 B2 to Bredt et al., U.S. Pat. No. 7,332,537 B2 to Bredt et al., U.S. Pat. No. 7,531,117 B2 to Ederer et al., U.S. Pat. No. 7,955,537 B2 to Ederer et al., and U.S. Pat. No. 8,211,226 B2 to Bredt et al.

One difficulty with the prior art methods of using three-dimensional printing to produce casting molds is their complexity. In the art cited above, it is necessary to use a multi-component build materials. For example, the build material disclosed in U.S. Pat. No. 7,955,537 requires the build material to consist of a particulate material and a reactive material and the jetted fluid reacts with the reactive material. Another difficulty with the prior art is that the build material that goes into making the bed of layers but which is not in the printed part may not be reusable as a build material.

SUMMARY OF THE INVENTION

The present invention overcomes the difficulties of the prior art by providing methods for making metal casting molds by three-dimensional printing which does not require a complex build material. Rather, the build material used in the three-dimensional printing of a casting mold or mold component according to the present invention may be any conventional casting sand that has not been treated or combined with another material. Hereinafter, such a casting sand will be referred to as "untreated." It is a surprising discovery that untreated casting sand can be used in combination with a polymer-based binder in the three-dimensional printing process to make casting molds and components thereof which are suitable for use in casting metal parts.

According to one aspect of the present invention, methods are provided which comprise the spreading of a layer of an untreated casting sand and then the selective application of a binder onto that layer, the spreading of another layer of untreated casting sand and the selective application of a binder onto that layer, and so on, until the desired metal casting mold or casting mold component part is built. The term "built part" will be used hereinafter to refer to as-printed the metal casting mold or casting mold component part. The built part may subsequently be heated to cure the binder and employed in the casting process to make a metal casting. The built parts made in accordance with the present invention are surprisingly strong.

According to another aspect of the present invention, casting molds and casting mold components are provided which comprise casting sand particulates bonded together by a binder.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

DESCRIPTION OF PREFERRED EMBODIMENTS

Figure 1:
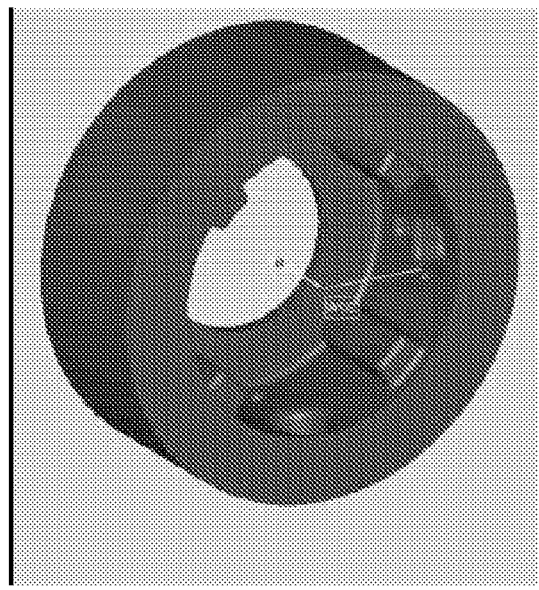
FIG. 1 is schematic showing the interior of the mold that was selected to be made as described Example 1.

The criticality of the features and merits of the present invention will be better understood by reference to the attached drawings. It is to be understood, however, that the drawings are designed for the purpose of illustration only and not as a definition of the limits of the present invention. It is to be understood that whenever a range of values is described herein or in the appended claims that the range includes the end points and every point therebetween as if each and every such point had been expressly described. Unless otherwise stated, the word "about" as used herein and in the appended claims is to be construed as meaning the normal measuring and/or fabrication limitations related to the value which the word "about" modifies.

Method embodiments of the present invention employ the three-dimensional printing process to make metal-casting molds (including for centrifugal casting) and components for metal casting molds, e.g. cores, chills, and investment casting patterns. Any conventional casting sand in the untreated condition may be used as a build material. Examples of such casting sands include silica sand, fused silica sand, lake sand, bank sand, pit sand, chromite sand, zircon sand, olivine sand, alumina sand, mullite sand, and synthetic sands and combinations thereof. The build material may have any particle size that is amenable to three-dimensional printing; however, it is preferred that the average particle size be in the range of about 10 microns to about 1 millimeter, and more preferably in the range of about 20 to about 700 microns.

The method embodiments of the present invention employ binders suitable for use in the three-dimensional printing process. Suitable binders include a polymer, carrier, humectant, and, optionally, a surfactant. Suitable polymers include polyvinylpryrrolidone (preferably with a K value of between about 10 and about 100), sucrose, fructose, high fructose corn syrup, and polyvinyl alcohol. Suitable carriers include water, 2-butoxyethanl, and isopropyl alcohol. Suitable humectants include diethylene glycol, ethylene glycol, propylene glycol, polypropylene glycol, and glycerol. Suitable surfactants include 2-methoxyethanol, 2-butoxyethanol, silicone oil, sodium laurel sulfate, ethanol, isopropyl alcohol. The amounts of each of the binder components is to be adjusted to provide acceptable three-dimensional printing and printed part characteristics. The components that are most sensitive to the jet deposition, i.e. jet printing, conditions (including ambient temperature, humidity, build material, drying heat, print head characteristics, printing speed, etc.) are the carrier, surfactant, and humectant so the amounts of these components are chosen to achieve the desired printing behavior. Preferably, the relative amount of carrier is in the range of about 75 to 95 weight percent, the relative amount of the humectant is no more than about 3 weight percent, and the relative amount of surfactant (when used) is no more than about 3 weight percent. The relative amount polymer is chosen to provide the amount of bonding required for the build part. Preferably, the relative amount of the polymer is in the range of about 5 to about 20 weight percent.

The ink-jet printing of the binder material should utilize droplets of materials the shrink characteristics of which are selected so that the dimensional tolerances of the part being made are maintained upon hardening thereof. While the binder solution must have a relatively high binder content, the viscosity thereof should be low enough so as to be able to flow through the printing head for deposit into the powder material. The binder material should be selected to penetrate the layer and to perform its binding action relatively rapidly in each layer so that the next layer of powder particles can be subsequently applied thereto. When using certain ink-jet technology the binder material may require at least a minimum electrical conductivity, particularly when using currently available continuous jet printing heads, for example, which require enough conductivity to establish charge on the binder solution droplets as they are emitted from the head. Where conductivity cannot be established in the binder, as with certain organic solvents, for example, the binder can be applied using drop-on-demand print heads.

The binder material may be such that the bonded particles have a high binding strength as each layer is deposited so that, when all the layers have been bonded, the component formed thereby is ready for use without further processing. In other cases, it may be desirable, or necessary, to perform further processing of the part. For example, while the process may be such as to impart a reasonable strength to the component to be formed, once the part is formed it can be further heated or cured to further enhance the binding strength of the particles. The binder in some cases can be removed during such heating or firing process, while in others it can remain in the material after firing. Which operation occurs depends on the particular binder material which has been selected for use and on the conditions, e.g., temperature, under which the heating or firing process is performed. Other post-processing operations may also be performed following the part formation.

To practice the methods of the present invention, a binder and a build material are selected as are a three-dimensional printing apparatus and one or more casting molds or casting mold components to make. A printing file suitable for the three-dimensional printing apparatus is acquired for each of the components to be made. If more than one part is to be made at a time, a build file is created in which an arrangement is made of the parts to be built in the build bed. The parts are then made layer-by-layer from the untreated build powder and the binder. At the conclusion of the building process, the built part or parts are heated to drive off the remaining carrier and to cure the binder and then removed from the build bed. The built parts may then be assembled into a mold set and molten metal may be cast into the mold set. Optionally, a coating, such as a wash or a release agent, e.g. boron nitride, a may be applied to the surface of the built part that is to contact the molten metal during casting.

It is to be understood that cores made in accordance with some embodiments may be removable from the metal casting by dissolution of the core with the solvent which is the same or similar to the carrier that was used as part of the binder that was used in the three-dimensional printing process to make the mold from which the core was made.

EXAMPLES

Example 1

A trial of an embodiment of the present invention was conducted using a dual pedestal three-dimensional printing apparatus built by The ExOne Company of North Huntingdon, Pa., US, having a build box size about 19 centimeters inches wide in the build direction, about 19 centimeters wide in the transverse direction, and about 7.6 centimeters deep. The build powder was an untreated chromite sand having an average particle size of 500 microns. The binder was chosen in which the polymer was polyvinylpryrrolidone K-15, the carrier was 2-methoxyethanol, and the humectant was diethylene glycol. The portion of the polymer in the binder was about 10 weight percent. The build layer thickness was about 600 microns.

Figure 2:
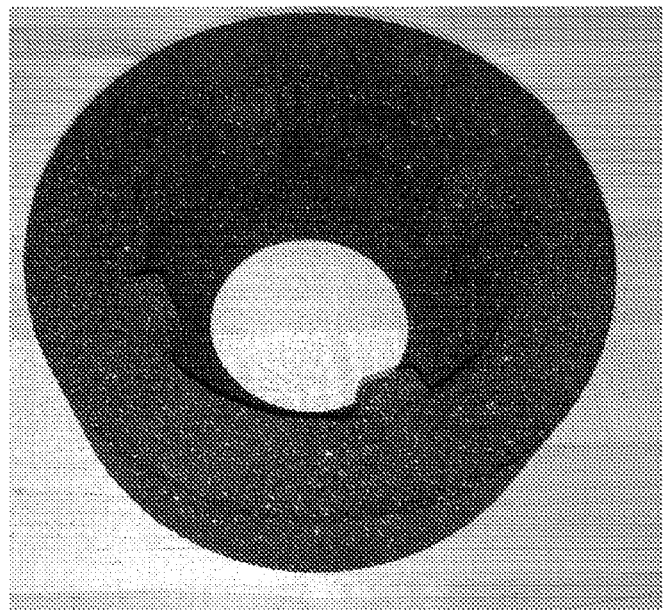
FIG. 2 is photograph showing a mold made in accordance with the present invention as described in Example 1.
Figure 4:
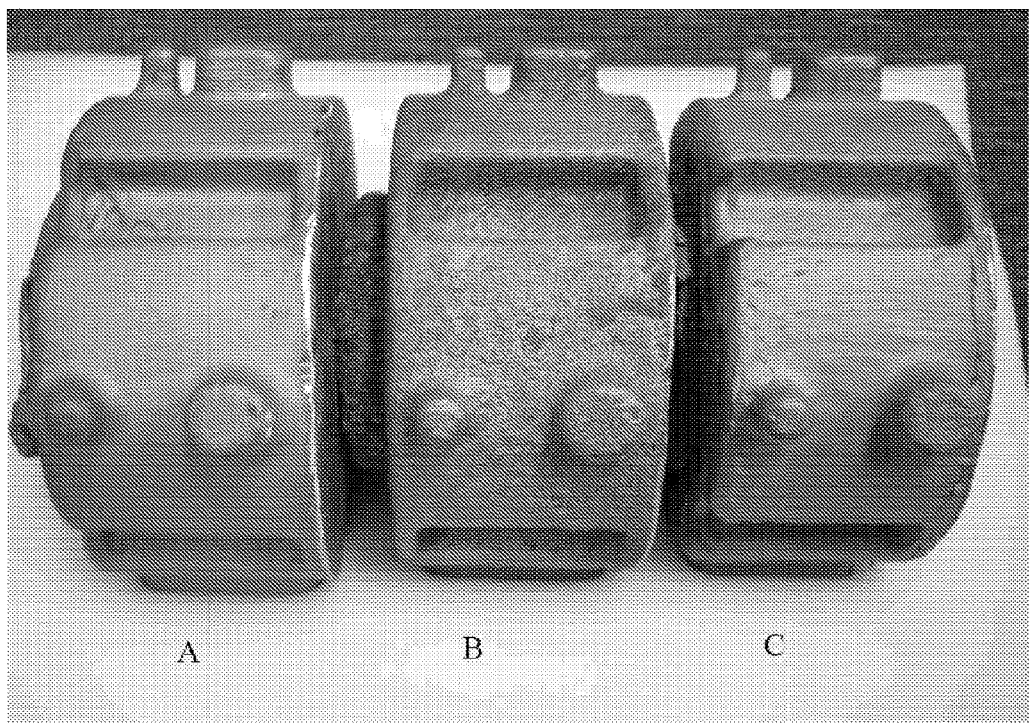
FIG. 4 is a photograph showing a casting A made from a conventional mold and castings B, and C made from the molds described in Example 1 that were made in accordance with the present invention.

The part that was selected was a metal-casting mold and is shown in FIG. 1. Two of these molds were built according an embodiment of the present invention. One of the build molds is shown in FIG. 2. The mold had an internal bottom diameter of about, 18.41 centimeters and an internal depth of about 6.96 centimeters. One of the molds was subsequently dip coated with a zircon/alcohol mold wash and then dried at 82° C. for about 5 minutes. Molten WC-9 low alloy steel at approximately 1583° C. was poured into both of the molds and allowed to solidify. The castings were removed from the molds. FIG. 4 shows the casting along with a casting which was made using conventional furan-bonded silica molds. Casting A was made in the conventional silica mold. Casting B was made in the inventive mold that was not washed and Casting C was made in the inventive mold that was washed with zircon/alcohol mold wash.

Example 2

Figure 3:
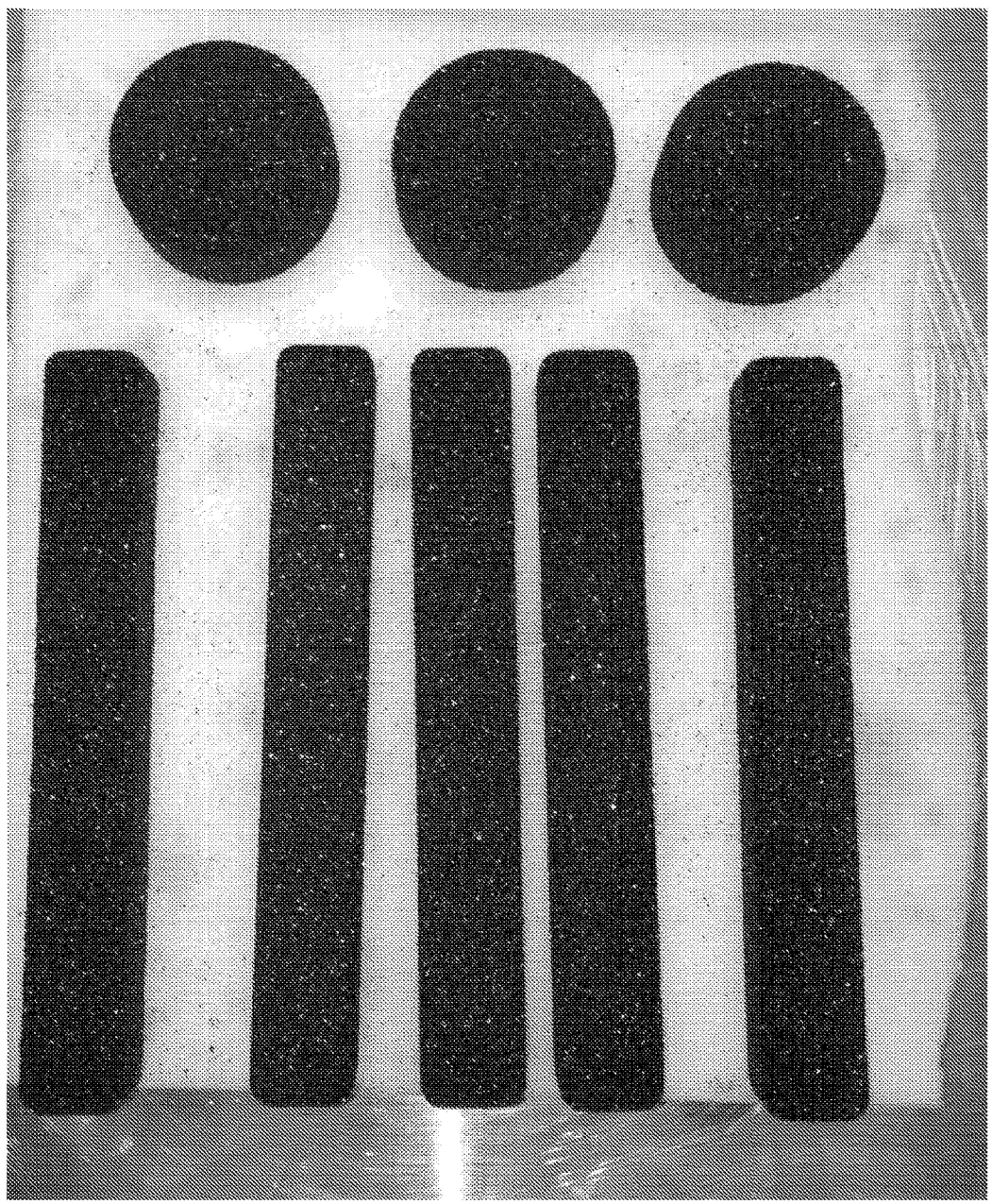
FIG. 3 is a photograph showing the pucks and test bars which were made in accordance with the present invention as described in Examples 2 and 3.

Using the same conditions and materials described for Example 1, test pucks were made according to an embodiment of the present invention. These test pucks were about 5.0 centimeters in diameter and 2.54 centimeters tall and are shown in FIG. 3. These test pucks were used to measure loss of immersion ("LOI") and permeability.

The LOI test measures the loss of weight of when a part is fired by taking the ratio of the weight of the part after firing to the weight of the part before firing. The LOI results for two test pucks that were made in accordance with the present invention were very good at 0.3% and 0.4%.

The permeability test measures the gas flow rate of a part. The purpose of the test is to ensure that the part has sufficient permeability to permit outgassing during casting. The threshold minimum value for usability is 120. Each of two test pucks that were made in accordance with the present invention had permeability test values of 375.

Example 3

Using the same conditions and materials described for Example 1, test bars were made according to an embodiment of the present invention. These test bars were about 17.20 centimeters long, about 2.24 centimeters wide, and about 2.24 centimeters high and are shown in FIG. 3 These test bars were used to measure tensile strength. A minimum tensile strength of 250 Newtons/square centimeter is considered necessary for mold components. Two of the test bars that were made in accordance with the present invention were tested and had tensile strengths of 409 Newtons/square centimeter and 340 Newtons/square centimeters, respectively.

While only a few embodiments of the present invention have been shown and described, it will be obvious to those skilled in the art that many changes and modifications may be made thereunto without departing from the spirit and scope of the invention as described in the following claims. All United States patents and patent applications, all foreign patents and patent applications, and all other documents identified herein are incorporated herein by reference as if set forth in full herein to the full extent permitted under the law.

What is claimed is:

1. A binder comprising a composition including (a) a carrier in an amount that is in the range of 75 to 95 weight percent, (b) high fructose corn syrup in an amount that is in the range of 5 to 20 weight percent, (c) a humectant in an amount of greater than zero weight percent and no more than 3 weight percent, and (d) a surfactant in an amount of greater than zero weight percent and no more than 3 weight percent, wherein the particular amounts of (a), (b), (c), and (d) in the composition are selected to enable the binder to be selectively applied by jet printing onto a build powder in a three-dimensional printing process and to bind particles of the build powder together in selected areas of the build powder with sufficient strength to form a desired article and the surfactant is selected from the group consisting of 2-methoxyethanol, 2-butoxyethanol, silicone oil, sodium laurel sulfate, ethanol, and isopropyl alcohol.

2. The binder of claim 1 wherein the carrier is water.

3. The binder of claim 1 wherein the humectant is selected from the group consisting of diethylene glycol, ethylene glycol, propylene glycol, polypropylene glycol, and glycerol.

4. A method for making an article which is a metal casting mold or component for a metal casting mold comprising the steps of:
   a) obtaining a representation of the article;
   b) selecting an untreated sand as a build material;
   c) selecting a binder comprising a composition including a carrier in an amount that is in the range of 75 to 95 weight percent, high fructose corn syrup in an amount that is in the range of 5 to 20 weight percent, a humectant in an amount of greater than zero weight percent and no more than 3 weight percent, and a surfactant in an amount of greater than zero weight percent and no more than 3 weight percent, wherein the particular amounts of the carrier, the high fructose corn syrup, the humectant, and the surfactant in the composition are selected to enable the binder to be selectively applied by jet printing onto a build powder in a three-dimensional printing process and to bind particles of the build powder together in selected areas of the build powder with sufficient strength to form a desired article and the surfactant is selected from the group consisting of 2-methoxyethanol, 2-butoxyethanol, silicone oil, sodium laurel sulfate, ethanol, and isopropyl alcohol;
   d) using the representation of the article, the build material, and the binder to three dimensionally print the article;
   wherein the article is adapted for being a metal-casting mold or a component of a metal casting mold.

5. The method of claim 4, wherein the untreated sand is selected from the group consisting of silica sand, fused silica sand, lake sand, bank sand, pit sand, chromite sand, zircon sand, olivine sand, alumina sand, mullite sand, and synthetic sands and combinations thereof.

* * * * *